United States Patent [19]

Page

[11] 3,902,796
[45] Sept. 2, 1975

[54] OPHTHALMIC FRAME FOR TENSIONALLY SECURING LENSES THERETO

[76] Inventor: Louis J. Page, 191-21 Hillside Ave., Hollis, N.Y. 11423

[22] Filed: June 16, 1972

[21] Appl. No.: 263,439

[52] U.S. Cl. .................. 351/92; 351/61; 351/95; 351/106
[51] Int. Cl.² ................. G02C 1/08; G02C 1/04
[58] Field of Search ............ 351/95, 96, 97, 98, 92, 351/61, 106

[56] References Cited
UNITED STATES PATENTS

| | | | |
|---|---|---|---|
| 1,325,362 | 12/1919 | Page ...................................... | 351/97 |
| 2,077,051 | 4/1937 | Messingen ............................. | 351/95 |
| 2,535,321 | 12/1950 | Rooney.................................. | 351/92 |
| 2,730,012 | 1/1956 | Malcom.................................. | 351/97 |
| 2,998,610 | 9/1961 | Spero................................. | 351/97 X |

FOREIGN PATENTS OR APPLICATIONS

| | | | |
|---|---|---|---|
| 1,017,419 | 1/1966 | United Kingdom................... | 351/92 |
| 1,380,136 | 10/1964 | France................................... | 351/92 |
| 727,908 | 2/1966 | Canada................................. | 351/92 |
| 179,461 | 5/1922 | United Kingdom................... | 351/95 |
| 428,481 | 6/1911 | France................................... | 351/95 |

Primary Examiner—Paul A. Sacher

[57] ABSTRACT

An ophthalmic frame is provided for tensionally securing lenses thereto which comprises rim members having an opening and provided with a groove extending along the inner surface thereof to hold the edge portion of a lens therein, means for tensionally securing the lenses therein, at least one of the following arrangements provides such means, a resilient connecting member spanning the opening in the rim member and attached to opposite sides thereof in such a manner that the end portions of the rim member are urged toward each other and or the end portions of the rim member being deformed inwardly toward the center of the lens in their normal state and tensionally urged to follow the contour of the peripheral edge portion of the lens when the lens is mounted therein, thereby tensionally securing the lens therein.

10 Claims, 5 Drawing Figures

PATENTED SEP 2 1975  3,902,796

OPHTHALMIC FRAME FOR TENSIONALLY SECURING LENSES THERETO

This invention relates to ophthalmic frames having rim members provided with a groove directed along the inner surface thereof and having an opening to receive a lens therein and means for tensionally securing the end portions of the rim member together. In ophthalmic frames of this type the ends of the rim member are usually fastened together by means of screws or other means fixedly securing the ends thereof together. Such frames have the common fault of the screws loosening. Another fault is that the lens has a tendency to chip if it is not precisely sized to fit the rim member and there is is a tendency for hardened lenses to implode. It is common knowledge that hardened lenses have imploded in this type of frame.

One of the principle objects of my invention is to overcome these faults and in addition provide other features and advantages. Another object of this invention is to provide a frame having a screwless assembly for securing lenses therein. Another object is to provide a frame in which lenses can be easily assembled and the size of the lens need not be so precise for a satisfactory fit of the lens in the rim member. In addition it is less costly to manufacture my frame than the type using screws or other mechanical means to secure the end portions of the rim members together.

These and other objects and advantages of my invention reside in the novel arrangement of the parts and features of construction which will be more fully understood from the accompanying drawing and the following description and claims.

Referring to the drawing.

Figure 1:
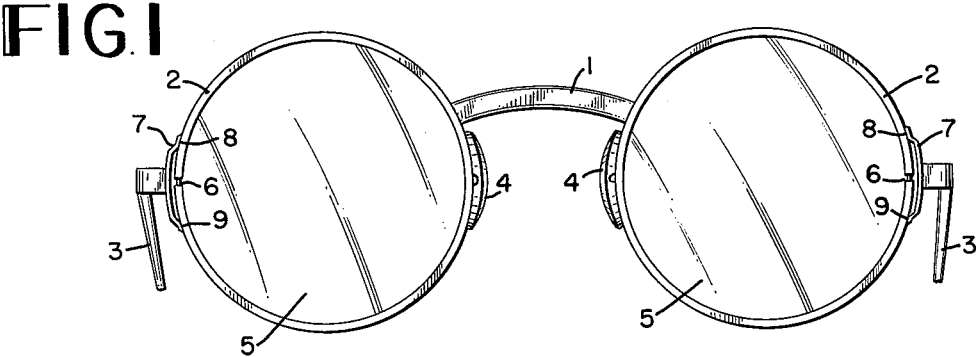
FIG. 1 is a front view of a frame embodying my invention.
Figure 2:
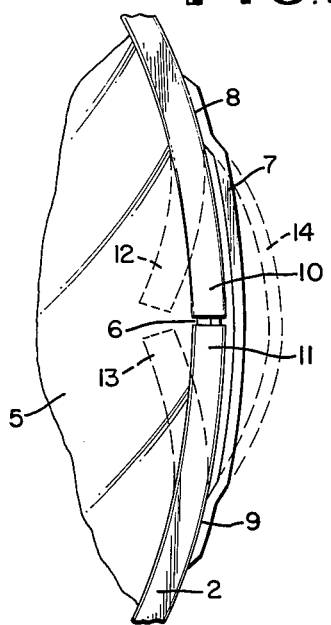
FIG. 2 is a fragmentary enlarged front view showing the relationship of the connecting member and the opening in the rim member.

Referring to the drawing the same numbers designate similar parts in the different views. In FIG. 1, the bridge 1 connects a pair of spaced rim members 2. A pair temples 3 are attached to the temporal side portions of the rim members and a pair of nose pads 4 are attached to the nasal side portions thereof. Each of the rim members are provided with a groove directed along the inner surface thereof to hold the edge portion of the lens 5. The rim members 2 have an opening at 6 and the end portions thereof are connected by means of a resilient connecting member 7 which is attached to the rim member 2 at points such as shown at 8 and 9 in FIGS. 1 and 2. The points of attachment 8 and 9 of the connecting member 7 to the rim member 2 are spaced from the end portions 10 and 11 thereof. The end portions 10 and 11 of the rim member 2 are deformed inwardly as shown by the dash lines 12 and 13 in FIG. 2, and the connecting member 7 is deformed as shown by the dash lines at 14 in the same Figure. The formation of the end portions 10 and 11 of the rim member 2 shown by the dash lines 12, 13 and the dash line 14 of the connecting member 7 are the normal state of these parts so that when the lens 5 is inserted into the groove of the rim member 2, the end portions 10,11 of the rim member 2 are urged to follow the contour of the peripheral edge portion of the lens 5 and the connecting member 7 is urged to distend whereby the lens is resiliently and tensionally secured therein by the forces exerted thereon by the end portions of the rim member and the connecting member. I prefer to make the connecting member 7 resilient so that in addition to the tension exerted on the edge portion of the lens by the end portions of the rim member, the connecting member provides an additional spring tension whereby the rim member can expand and contract on the edge portion of the lens. The lens is mounted into the rim member by inserting it first into the portion of the rim member at the opening thereof while pressing the center portion of the connecting member against a stop, the lens is forced against the deformed end portions of the rim member toward the connecting member whereby the connecting member is distended allowing the lens to be snapped into the remaining portion of the rim member. The lens is removed by reversing the proceedure. The connecting member 7 may be made of a pliable material in which case after the lens in inserted into the rim member a hollow chop or half round plier is used to form a curve thereof whereby the end portions of the rim member are drawn together securing the lens therein. In FIG. 1 I have shown the connecting member 7 extending in the same plane as the rim member but it may be directed in any suitable plane relative to the rim member. The connecting member 7 and the opening 6 in the rim member may be located at any desired location relative to the peripheral edge portion thereof. The formation of the connecting member 7 may be formed in any suitable shape such as a coil, loop or any other form. The rim members may be made of a non-resilient material such as plastic or aluminum in which form the resilient connecting member provides the tension means for securing the lens therein. The connecting member may be attached to the rim member by soldering, screws, rivets or any suitable means.

Figure 3:
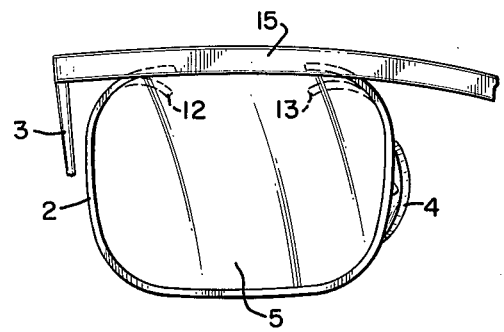
FIG. 3 is a fragmentary front view of a modified form of my invention.
Figure 4:
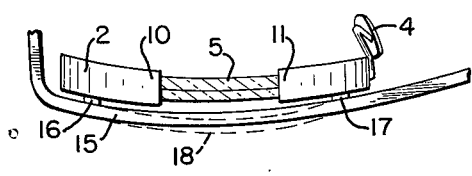
FIG. 4 is a fragmentary top view of the form of my invention shown in FIG. 3.

A modified form of my invention is shown in FIGS. 3 and 4. In this arrangement the rim member 2 is attached to a brow bar 15 at such points as shown at 16 and 17 in FIG. 4 so that the end portions 10 and 11 of the rim member 2 are free and preferably deformed as shown by the dash lines at 12 and 13 in FIG. 3. The brow bar 15 is also preferably deformed as shown by the dash lines at 18 in FIG. 4 so that when the lens 5 is inserted into the rim member 2, the action of the free ends 10 and 11 of the rim member 2 and the central portion of the bar member 15 is such that the lens is tensionally secured therein. The lens is inserted into the rim member similarly as already described.

Figure 5:
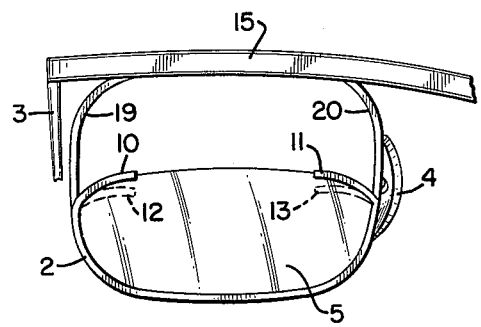
FIG. 5 is a fragmentary front view of another modified form of my invention showing a half eye arrangement.

In FIG. 5 is shown another modified form of my invention. This form of my invention is employed for presbyopic prescriptions so that the distant vision will not be blurred when the wearer looks up at a distant object. In this arrangement the grooved rim member 2 is attached to the brow bar 15 by the supports 19 and 20 as shown in FIG. 5, so that the top edge of the lens 5 is spaced from the lower edge of the brow bar 15. The lens 5 is inserted into the rim member 2 similarly as described for the other forms shown.

Applicant prefers to supply the frame to the optician with the end portions of the rim member formed having substantially the same contour as the contour of the peripheral edge portion of the lens and the connecting member having substantially the same contour shape that the rim member takes when the lens is inserted therein. The lens is edged to a size so that it can be inserted into the groove of the rim member. With the lens removed from the rim member, the end portions of the rim member and the connecting member are deformed as shown by the dash lines of these parts in the drawing so that the end portions of the rim member and the connecting member perform in the manner already described for these members. The deformation of these members is easily done by the optician by inserting the blade of a small screw driver between the end portion of the rim member and the adjacent part of the connecting member and prying the members apart and then twisting the blade therein. Additional adjustments of the members can now be made by the opticain with a plier.

In the several views and specification applicant has shown and described different arrangements of his invention and does not limit himself to these applications. It is understood that other modifications of his invention might be conceived embodying the general principles of this invention. From the foregoing and accompanying drawing it is apparent that I have provided an ophthalmic frame in accordance with the objects of my invention.

I claim:

1. An ophthalmic frame having a bridge member connecting a pair of spaced rim members, each of said rim members having a groove directed along the inner surface thereof and arranged to extend around the periphery of a lens, each of said rim members being provided with an opening, connecting means, said connecting means being attached to said rim members at points spaced from the ends of said rim member, the portions of the rim member between said points of attachment of said connecting means to said rim member being deformed inwardly toward the center thereof, and the properties and formation of said connecting means and the deformed end portions of the rim member being such that when a lens is inserted into the groove in said rim member, the deformed end portions of the rim member are urged to substantially follow the contour of the peripheral edge portion of the lens and in co-operation with said connecting means tensionally secures the lens therein.

2. An ophthalmic frame as set forth in claim 1, wherein said connecting means is a resilient member being attached to said rim member at points spaced from the end portions thereon, said connecting means being such to allow a lens to be snapped into said rim member and then contracting thereon, thereby urging the end portions of said rim member in such a manner to resiliently secure the lens therein.

3. An ophthalmic frame as set forth in claim 1, wherein said connecting means being attached to said rim members at points spaced from the end portions thereon, the portions of the rim member between said points of attachment of the connecting means to the rim member being deformed inwardly toward the center thereof and the properties and formation of said rim member being such that when the edge portion of a lens is inserted into the groove in said rim member, the deformed end portions of the rim member are urged to substantially follow the contour of the peripheral edge portion of the lens, thereby tensionally securing the lens therein.

4. An ophthalmic frame as set forth in claim 1, wherein said connecting means and the portion of said rim member between the points of attachment of said connecting means to said rim member being formed to substantially follow the contour of the peripheral edge portion of a lens, the portions of said rim member between the points of attachment of said connecting means to said rim member and said connecting means being deformed by the optician so that a lens inserted in said rim member urges the deformed portions of the rim member and said connecting means to substantially follow the contour of the peripheral edge portion of the lens, whereby the deformed end portions of said rim member and said connecting means tensionally secures the lens therein.

5. An ophthalmic frame as set forth in claim 1, wherein said connecting means is formed so as to expand and contract whereby the circumferential dimension of said rim member can be expanded so that a lens can be snapped therein and then contracting thereon, thereby resiliently securing the lens therein.

6. An ophthalmic frame as set forth in claim 1, wherein said means connecting opposite side portions of said rim member at the opening therein, said means being formed and arranged by the optician, whereby the end portions of the rim member are urged toward each other, thereby securing the lens therein.

7. An ophthalmic frame having a bridge member connecting a pair of spaced resilient rim members, each of said rim members having a groove directed along the inner surface thereof and provided with an opening, means connecting opposite portions of said rim member and attached thereto at points spaced from the ends at the opening thereof so that opposing end portions of said rim member at the opening thereof can be deformed inwardly toward the center thereof whereby a lens inserted in said rim member urges the deformed end portions of said rim member to substantially follow the peripheral contour edge of the lens thereby tensionally securing the lens therein.

8. An ophthalmic frame having a brow bar member connecting a pair of spaced resilient rim members having a groove directed along the inner surface thereof and provided with an opening for the insertion of a lens therein, each of said rim members being attached to said brow member and arranged so that the end portions of the rim member extend therefrom, in a normal state, inwardly toward the center thereof, whereby a lens inserted into said rim member urges the end portions of the rim member to substantially follow the peripheral contour edge of the lens, thereby tensionally securing the lens therein.

9. An ophthalmic frame having a resilient brow bar member connecting a pair of spaced rim members having a groove directed along the inner surface thereof and provided with an opening for the insertion of a lens therein, each of said rim members being attached to said brow bar member so that the end portions of the rim member at the opening thereon are spaced apart and the portion of said brow bar member extending between the points of attachment of said rim member to said brow bar member can be deformed transversely whereby a lens inserted in the groove of said rim member urges the deformed central portion of said brow bar member to distend thereby tensionally securing the lens therein.

10. An ophthalmic frame having a bar member, a pair of spaced rim members having a groove directed along the inner surface thereof, said rim members being arranged to extend at least around a portion of the edge of a lens, so that the free end portions thereof tensionally embrace the edge portions of the lens in contact therewith said rim members being attached to said bar member at points spaced from the ends of said rim members, so that the bar member in co-operation with the end portions of the rim member tensionally secures the lens in said rim member.

* * * * *